United States Patent
Brunner et al.

(10) Patent No.: US 9,784,410 B2
(45) Date of Patent: Oct. 10, 2017

(54) OPERATING METHOD FOR A CRYOPRESSURE TANK

(71) Applicant: Bayerische Motoren Werke Aktiengesellschaft, Munich (DE)

(72) Inventors: Tobias Brunner, Grasbrunn (DE); Manuel Tolosa, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 477 days.

(21) Appl. No.: 14/494,985

(22) Filed: Sep. 24, 2014

(65) Prior Publication Data
US 2015/0007584 A1   Jan. 8, 2015

Related U.S. Application Data

(63) Continuation of application No. PCT/EP2013/053020, filed on Feb. 14, 2013.

(30) Foreign Application Priority Data

Mar. 26, 2012   (DE) .................. 10 2012 204 818

(51) Int. Cl.
*F17C 7/00* (2006.01)
*F17C 1/00* (2006.01)

(52) U.S. Cl.
CPC .................. *F17C 7/00* (2013.01); *F17C 1/00* (2013.01); *F17C 2203/0391* (2013.01);
(Continued)

(58) Field of Classification Search
CPC ........ F28D 2021/0043; H01M 8/04074; F17C 7/00
See application file for complete search history.

(56) References Cited

U.S. PATENT DOCUMENTS

| 1,773,140 A | 8/1930 | Heylandt |
| 3,062,017 A | 11/1962 | Balcar et al. |

(Continued)

FOREIGN PATENT DOCUMENTS

| DE | 539 336 | 11/1931 |
| DE | 10 2007 011 530 A1 | 9/2008 |

(Continued)

OTHER PUBLICATIONS

International Search Report (PCT/ISA/210) dated Aug. 9, 2013 with English translation (seven pages).

(Continued)

*Primary Examiner* — Timothy L Maust
*Assistant Examiner* — Timothy P Kelly
(74) *Attorney, Agent, or Firm* — Crowell & Moring LLP (57) ABSTRACT

An operating method is provided for a cryopressure tank in which cryogenic hydrogen for supplying a motor vehicle fuel cell can be stored under supercritical pressure at 13 bar or more. In order to compensate the pressure drop resulting from removal of hydrogen from the cryopressure tank, either a heat transfer medium is supplied to a heat exchanger provided in the cryopressure tank via a control valve over a period of time which significantly exceeds the cycle times of a conventional cycle valve or the heat transfer medium is not supplied to the heat exchanger. Depending on the fill level of the cryopressure tank, the control valve is actuated with respect to a desired temperature or a desired pressure of the hydrogen in the cryopressure tank. As long as there is a risk of liquefaction of the residual hydrogen in the cryopressure tank, as is the case when the temperature falls below the critical temperature of 33 K if the pressure drops below the critical pressure of approximately 13 bar, during the removal of cryogenic hydrogen from the cryopressure tank, the temperature is adjusted such that it does not drop below the (Continued)

critical temperature of 33 Kelvin. If the fill state in the cryopressure tank drops further, the pressure in the cryopressure tank is adjusted when there is no longer a risk of liquefaction such that the pressure does not drop below a minimum pressure value which the hydrogen that is removed from the cryopressure tank must have in order to be usable in the consumer without restricting the function thereof.

8 Claims, 5 Drawing Sheets

(52) U.S. Cl.
CPC ...... *F17C 2203/0629* (2013.01); *F17C 2221/012* (2013.01); *F17C 2223/0115* (2013.01); *F17C 2223/035* (2013.01); *F17C 2225/035* (2013.01); *F17C 2227/0306* (2013.01); *F17C 2227/0309* (2013.01); *F17C 2227/0369* (2013.01); *F17C 2227/047* (2013.01); *F17C 2250/043* (2013.01); *F17C 2250/0439* (2013.01); *F17C 2250/0626* (2013.01); *F17C 2250/0631* (2013.01); *F17C 2250/072* (2013.01); *F17C 2270/0178* (2013.01); *F17C 2270/0184* (2013.01); *Y02E 60/321* (2013.01)

(56) References Cited

U.S. PATENT DOCUMENTS

| | | |
|---|---|---|
| 3,216,209 A | 11/1965 | Krigsman |
| 3,650,290 A | 3/1972 | Moen et al. |
| 5,467,603 A | 11/1995 | Lehman et al. |
| 6,708,502 B1 | 3/2004 | Aceves et al. |
| 8,454,730 B2 | 6/2013 | Von Helmolt et al. |
| 2009/0308083 A1 | 12/2009 | Brunner |
| 2010/0236259 A1 | 9/2010 | Brunner et al. |
| 2015/0072260 A1* | 3/2015 | Brunner ............... F17C 13/005 429/436 |

FOREIGN PATENT DOCUMENTS

| | | |
|---|---|---|
| DE | 10 2007 011 742 A1 | 9/2008 |
| DE | 10 2011 017 206 A1 | 11/2011 |
| EP | 0 670 452 A1 | 9/1995 |
| EP | 2 217 845 B1 | 4/2011 |
| FR | 1 257 015 | 3/1961 |

OTHER PUBLICATIONS

German Search Report dated Dec. 19, 2013 with partial English translation (10 pages).

* cited by examiner

OPERATING METHOD FOR A CRYOPRESSURE TANK

CROSS REFERENCE TO RELATED APPLICATIONS

This application is a continuation of PCT International Application No. PCT/EP2013/053020, filed Feb. 14, 2013, which claims priority under 35 U.S.C. §119 from German Patent Application No. 10 2012 204 818.9, filed Mar. 26, 2012, the entire disclosures of which are herein expressly incorporated by reference.

This application contains subject matter related to U.S. application Ser. No. 14/495,080 entitled "Operating Method for a Fuel Cell System" filed on Sep. 24, 2014.

BACKGROUND AND SUMMARY OF THE INVENTION

The invention relates to an operating method for a cryopressure tank in which cryogenic hydrogen for supplying a consumer, in particular a fuel cell of a motor vehicle, can be stored under supercritical pressure at 13 bar or more. For compensating the pressure drop resulting from the removal of hydrogen from the cryopressure tank, either a heat transfer medium is supplied via a control valve to a heat exchanger provided in the cryopressure tank or no supply of heat transfer medium takes place into said heat exchanger.

With regard to the prior art, reference is made to EP 2 217 845 B1 in which possible embodiments of an operating method for a cryopressure tank and also the so-called cryogenic storage in particular of hydrogen is described. As further relevant prior art, in addition to U.S. Pat. No. 6,708,502 B1, in particular German patent applications 10 2007 011 530.1 and 10 2007 011 742.8 are cited. In these documents it is described that in a so-called cryopressure tank cryogenic hydrogen can be stored at supercritical pressure values, namely at 150 bar and more, or, respectively, that in the course of refueling, such hydrogen can be filled at supercritical pressure into a suitable cryopressure tank, which offers significant advantages.

In order to be able to remove the hydrogen from the cryopressure tank with a certain minimum pressure level for supplying the consumer, this minimum pressure level is set or maintained by a defined heat input into the cryopressure tank, which, with the method according to EP 2 217 845 B1 is carried out in that a portion of the hydrogen removed from the cryopressure tank, after heating the same, is fed through an (internal) heat exchanger provided in the cryopressure tank, wherein it is also described in this document how such a minimum pressure level can be set with simple control measures and also with regard to the object of being able to empty the cryopressure tank as completely as possible.

For an operating method for a cryopressure tank, in which, deviating from the above-mentioned EP 2 217 845 B1, in addition to the removed hydrogen, another (any other) heat transfer medium can also be used for supplying heat into the cryopressure tank. The present object is to provide an improvement to the effect that the heat input into the cryopressure tank carried out for compensating the pressure drop resulting from the removal of hydrogen is kept as low as possible.

The solution to this object is characterized in that depending on the fill level of the cryopressure tank, the control valve is actuated based on different criteria, namely such that in the case of a higher filling level and as long as there is a risk of liquefaction of the residual hydrogen in the cryopressure tank during removal of cryogenic hydrogen from the cryopressure tank, the temperature of the hydrogen in the tank does not drop below the critical temperature (hereafter also designated as "temperature criterion"), while in the case of a low fill level, when there is no longer the risk of liquefaction during the removal of cryogenic hydrogen and as long as this is possible with the residual amount of hydrogen contained in the cryopressure tank, the pressure in the cryopressure tank is adjusted such that it does not drop below a minimum pressure value which the hydrogen removed from the cryopressure tank must have to be usable in the consumer without limiting the function of the latter (hereafter also designated as "minimum pressure criterion").

Through heat input—as already explained—pressure is built up in the cryopressure tank, which pressure ensures supply to the consumer. A heat input as low as possible into the cryopressure tank is particularly advantageous if only a so-called "single-flow" refueling or filling of the tank is intended, i.e., if it is not possible to flush the cryopressure tank during the refueling/filling process first with cold hydrogen which, after sufficient cooling of the cryopressure tank, is discharged again from the cryopressure tank prior to the actual filling.

It is preferred, in any case when heat supply into the cryopressure tank by means of the heat transfer medium is carried out only for meeting the above-mentioned temperature criterion, i.e., for maintaining a hydrogen temperature value of greater than 33.18 Kelvin, to reduce the heat supply as far as possible with regard to down times and tolerances. It is therefore preferred to keep the temperature of the hydrogen in the cryopressure tank as close as possible to the critical temperature (of 33.18 Kelvin) and thus, for example, in a range between 34 Kelvin and 40 Kelvin, as soon as or as long as during removal of cryogenic hydrogen from the tank there is a risk of liquefaction of the residual hydrogen remaining in the tank. Thus, the heat input into the cryopressure tank is kept as low as practically possible, wherein it is to be explicitly mentioned that in the case of a completely filled cryopressure tank it is of course possible that such a high pressure (for example of the order of 300 bar) and such a relatively high temperature (for example of the order of 50 Kelvin) prevails that by removing cryogenic hydrogen there is in first instance no risk of liquefaction, and a heat input into the cryopressure tank controlled according to the invention is therefore not required. Rather, in the case of an at least approximately completely filled tank, in first instance, it is only monitored that the mentioned temperature criterion is met.

In the present case, as it were, sequential temperature control and pressure control or, more precisely, feedback control is proposed, wherein above a certain fill level of the cryopressure tank, which, in the case of complete filling can be filled up to a pressure of, for example, 300 bar, a control strategy that can be provided in a simple manner including an easily measurable control variable, namely the temperature of the cryogenic hydrogen in the cryopressure tank, is used. It is ensured here that the temperature, in particular in connection with removal of hydrogen from the cryopressure tank, does not drop below the temperature of the "critical point" (=33.18 Kelvin), so that the desired supercritical state of the stored hydrogen is reliably maintained despite the removal of hydrogen. In fact, it is undesirable that hydrogen stored in the supercritical state in the cryopressure tank transitions into a state in the so-called two-phase region in which both liquid and gaseous hydrogen can be present. For the sake of completeness it should be noted that without removing hydrogen from the cryopressure tank, the risk that the hydrogen in the cryopressure tank cools down to an extent that the hydrogen partly or completely transitions into the undesirable liquid aggregate state does not exist due to the unavoidable minimal continuous heat input into the cryopressure tank through the tank wall thereof.

When the fill level of the cryopressure tank has dropped to such an extent that further removal of hydrogen from the tank no longer poses the risk of liquefaction of the hydrogen in the tank, the temperature criterion no longer needs to be taken into account. However, upon further removal of hydrogen, the pressure in the tank can fall relatively fast to such a low value (for example, of the order of 2 bar) that sufficient supply to the consumer would then no longer be ensured. For this reason, according to the invention, a switch is made to a pressure control to the effect that the pressure in the tank does not drop below a minimum pressure which the hydrogen that is removed from the tank must have so as to be usable in the consumer without limiting the function thereof. Hereby, the operating state of the cryopressure tank in which, according to the invention, a switch is made from the (described) temperature control to the (described) pressure control is basically described with sufficient accuracy by the criterion whether, in particular when removing hydrogen from the cryopressure tank, there is the risk of liquefaction of the hydrogen in the tank. As is well known, this risk only exists if the temperature of the hydrogen stored in the cryopressure tank is below the critical temperature (of 33.18 Kelvin) and, at the same time, the pressure is below the critical pressure (of 13 bar).

Within the context of meeting the above-mentioned temperature criterion, different control strategies, again in dependence on the fill level of the tank, can be of advantage. It has already been mentioned that in a completely filled cryopressure tank, a pressure of, for example, 300 bar and a temperature of, for example, 50 Kelvin can prevail therein.

Figure 5:
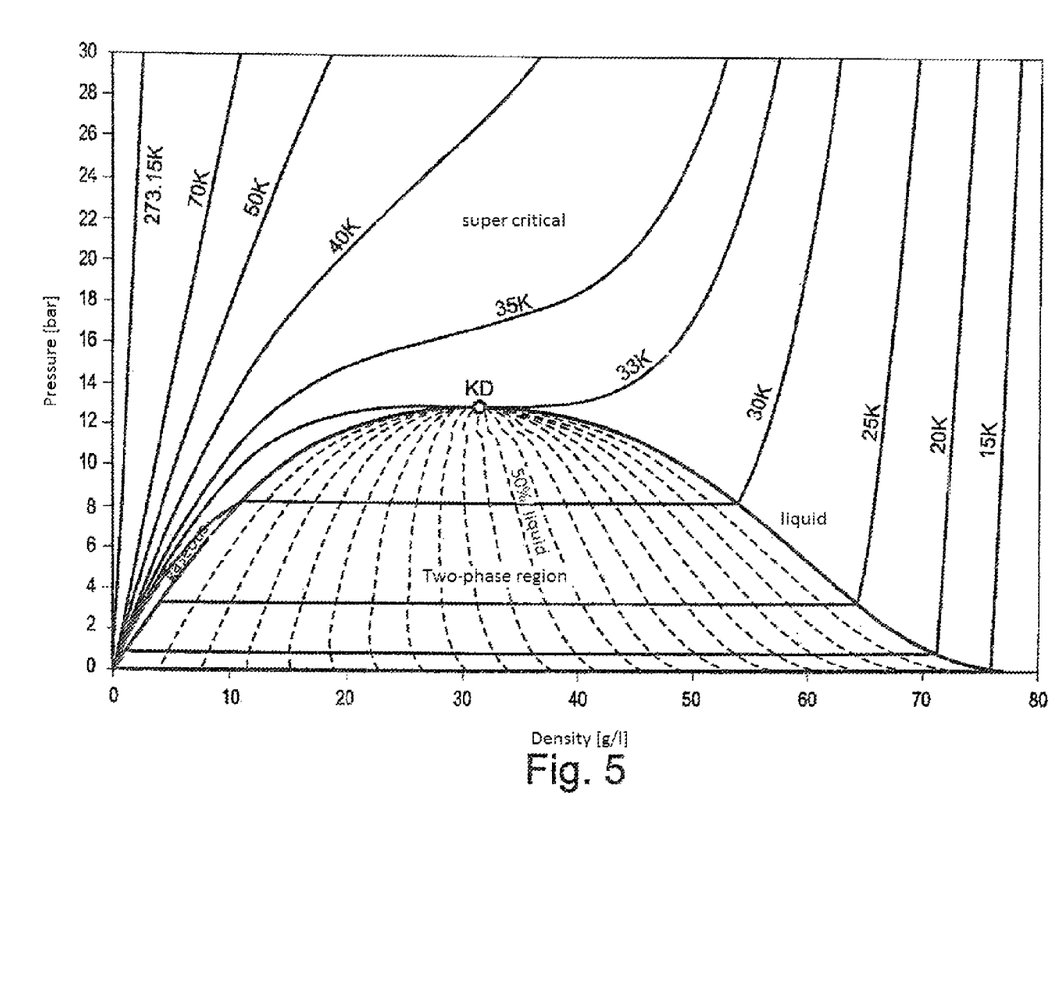
FIG. 5 shows the known pressure-density-diagram of hydrogen in the proximity of the critical point KD, which has already been discussed above in the background description.

If, starting from this state and upon removal of hydrogen from the tank, in the first instance a pressure drop and cooling-down of hydrogen remaining in the tank takes place, then, in this case, only the mentioned temperature criterion is relevant. Preferably, the heat input into the tank is kept low such that the temperature of 40 K is not exceeded. According to the known pressure-density-diagram of hydrogen (in particular in the proximity of the critical point), which is illustrated in part in the attached FIG. 5 and in DE 10 2007 011 530 A1 as FIG. 1, this results in a pressure in the tank of at least 13 bar. In the case of a still approximately completely filled cryopressure tank, the pressure in the tank is still significantly higher; however, with further reduction of the fill level of the tank, the pressure in the tank will approach this critical pressure of 13 bar (12.81 bar, to be exact). In the case of a fill level of this order of magnitude of slightly more than 13 bar and a temperature in the mentioned order of magnitude of 33 K to 40 K, it is therefore reasonable to input only so much heat or, better, only so little heat into the tank that the pressure in the cryopressure tank, while meeting the above-mentioned criterion which, in first instance, is still used as priority control variable, is or remains in the value range between 13 bar and 15 bar.

The heat input into the tank that, as it were, is added up over the consumption of a complete tank filling can be further minimized if at and onwards an operating state or fill state of the tank at which, while meeting the above-mentioned temperature criterion, the pressure in the tank can be lowered to values below the critical pressure, this pressure of the stored hydrogen is also lowered. With this in mind, it is then possible, if removing of hydrogen from the tank while supplying heat into the tank in view of maintaining a pressure of 13 bar to 15 bar and, at the same time, meeting the mentioned temperature criterion, results in a significant temperature increase of the hydrogen in the tank, to adjust the pressure in the tank to a lower value in the order of magnitude of 3 bar to 7 bar, which is still sufficient for supplying a fuel cell system or an internal combustion engine that is not charged or only to a minor extent.

With further reduction of the fill level, i.e., after further removal of hydrogen from the tank with the tank still being filled, for example, to one third, it could happen that by applying or meeting only the above-mentioned temperature criterion, finally a pressure occurs that not only lies below the pressure in the critical point, but can also drop rapidly to values below 3 bar. The stored hydrogen would still be in the gaseous state, as desired, but reliable supply of hydrogen from the cryopressure tank to the consumer would no longer be ensured by such a low pressure. Therefore, when removing hydrogen from the tank, heat is introduced into the tank only to such an extent that a pressure value in the order of magnitude of 3 bar to 7 bar is maintained, which is required for sufficient supply to the consumer, in particular to a fuel cell system. Through this, the state of pure pressure control (basically already described above) is achieved, in which the mentioned temperature criterion needs no longer to be taken into account since with decreasing filling quantity and thus dropping density, the temperature in the tank cannot fall below the critical temperature of 33.18 K any more. Rather, the mentioned minimum pressure criterion alone serves now for controlling the heat input into the cryopressure tank, wherein this pressure control is designed in such a manner that the control variable, namely the pressure of the hydrogen contained in the cryopressure tank, does not drop below a minimum value which is needed for reliably supplying a consumer without limiting the function thereof. As already described, this minimum value can lie in the order of magnitude of 3 bar to 7 bar and, preferably, in the order of magnitude of 5 bar (absolute), since therewith, depending on the losses of a line system with integrated regulators between the cryopressure tank and a fuel cell system (as an exemplary consumer), this fuel cell system can be reliably operated.

In other advantageous embodiments, analogous to the above-mentioned EP 2 217 845 B1, fuel removed from the tank and heated in an heat exchanger can be used as a heat transfer medium and can be supplied to the heat exchanger via a branch line branching off a supply line that leads to the consumer, and after flowing through the heat exchanger, it can be fed into the supply line downstream of the branching-off point of the branch line. Here, downstream of the above-mentioned branching-off point of the branch line, a pressure control unit can be provided in the supply line. The pressure control unit ensures that continuous supply of hydrogen at the required pressure to the consumer is ensured despite the changes in pressure in the supply line caused upstream of the pressure control unit by the switching of the control valve and defines the magnitude of the heat input into the tank (by actuating an electronic control unit). Furthermore, the control valve can be closed or opened over a time period that significantly exceeds the cycle times of a conventional cycle valve so as to keep the control process simple and also to keep the mechanical load on the control valve low.

According to an advantageous refinement of the operating method according to the invention, the waste heat of a fuel cell system as a consumer supplied from the tank can be fed at least in part to the mentioned heat transfer medium, which is known for a cryo-adsorptive storage device for hydrogen from DE 10 2011 017 206 A1. For minimizing the heat input into the cryopressure tank, it is proposed in the present case to carry out a partial heat dissipation from the fuel cell system into the tank only if this is necessary for satisfying a higher cooling capacity demand of the fuel cell system, which demand cannot be completely covered by the actual cooling system thereof which ultimately uses the surrounding air as a temperature sink. Depending on the demand, heat dissipation from the fuel cell system via the heat transfer medium with heat supply into the cryopressure tank is carried out only until the hydrogen in the tank has a predefined maximum pressure as a result of this heat supply. This predefined maximum pressure is designed in view of the maximum pressure allowable for the operational safety of the tank.

With the measures proposed here and, in particular, with the temperature and pressure control disclosed, it is principally possible to achieve a heat input into the cryopressure tank that is significantly reduced with respect to the prior art, as is apparent from the further explanation of two exemplary embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
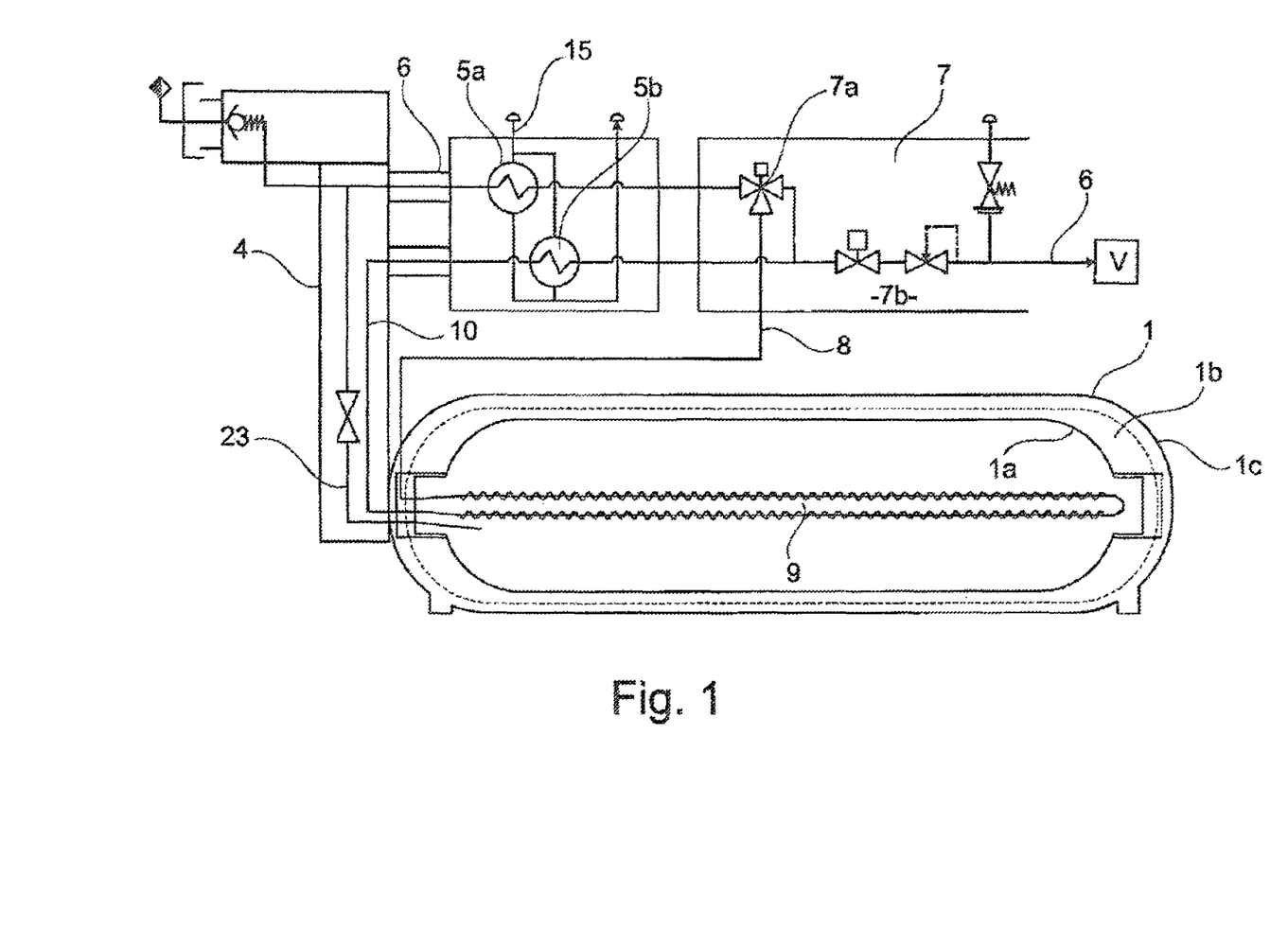
FIG. 1 is a schematic diagram showing a cryopressure tank with associated components, with which an embodiment of the operating method according to the invention can be carried out.

Referring to FIG. 1, a cryopressure tank 1, including its peripheral components necessary for understanding the present invention, is principally illustrated here. In the cryopressure tank 1 (also referred to as tank 1), cryogenic hydrogen for supplying a consumer V (which is not illustrated in detail), for example an internal combustion engine and/or a fuel cell of a motor vehicle, can be stored at absolute pressure values of the internal tank pressure in the order of magnitude of 150 bar or more, but at least under supercritical pressure at 13 bar and more. This cryopressure tank 1 consists of a pressure-resistant inner tank 1a, inside of which the cryogenic hydrogen is in a supercritical state, and also of an insulating layer 1b which surrounds the inner tank 1a and in which there is substantially a vacuum, and of an outer shell 1c enclosing the vacuum.

The inner tank 1a can be filled with cryogenic hydrogen in the supercritical state via a combined and thus single-flow filling and removal line 23, and hydrogen can be removed from the inner tank 1a via this filling/removal line 23. The line 23 extends or leads into a valve unit 4, which is only illustrated in an abstract manner and is not important for the present invention. For this, the valve unit 4 is connected to a first or external heat exchanger 5a through which, on the one side, a first heat transfer circuit 15 and secondly a supply line 6 are fed. The supply line 6 extends from the valve unit 4 and thereby connects to the filling/removal line 23, and finally leads to the already mentioned consumer V. The supply line 6 is in heat-transferring communication with the first heat transfer circuit 15 via the heat exchanger 5a so that the hydrogen carried in the supply line 6 is heated in the external first heat exchanger 5a.

Subsequent to the external first heat exchanger 5a, the supply line 6 is fed into a second valve unit 7, through which the supply line 6 is fed while passing through a tank pressure control valve 7a and a pressure control unit 7b before reaching the consumer V. A branch line 8 branches off from the tank pressure control valve 7a, through which branch line 8 the hydrogen removed from the cryopressure tank 1 and heated in the first (external) heat exchanger 5a is fed into a second (internal) heat exchanger 9 provided within the inner tank 1a of the cryopressure tank 1. After flowing through this second heat exchanger 9 provided within the cryopressure tank 1, more precisely, within the inner tank 1a thereof, this hydrogen is fed via a recirculation line 10 back into the supply line 6 downstream of the branching-off point of the branch line 8. This recirculation line 10 is first fed through a third (external) heat exchanger 5b, which is connected in parallel to the first (external) heat exchanger 5a and is supplied by the same heat transfer circuit 15. In the third (external) heat exchanger 5b, the hydrogen cooled in the second heat exchanger 9 is heated again through heat exchange with the mentioned heat transfer circuit 15. Thus, the hydrogen fed through the branch line 8 and also through the second internal heat exchanger 9 and the recirculation line 10 acts as a heat transfer medium for heating the hydrogen stored in the cryopressure tank 1. Controlling or feedback controlling this heating takes place by supplying said heat transfer medium or hydrogen to the internal heat exchanger 9, and it is thus controlled or feedback-controlled by the switching strategy of the tank pressure control valve 7a, as explained above in detail in the description of the figures.

Figure 2:
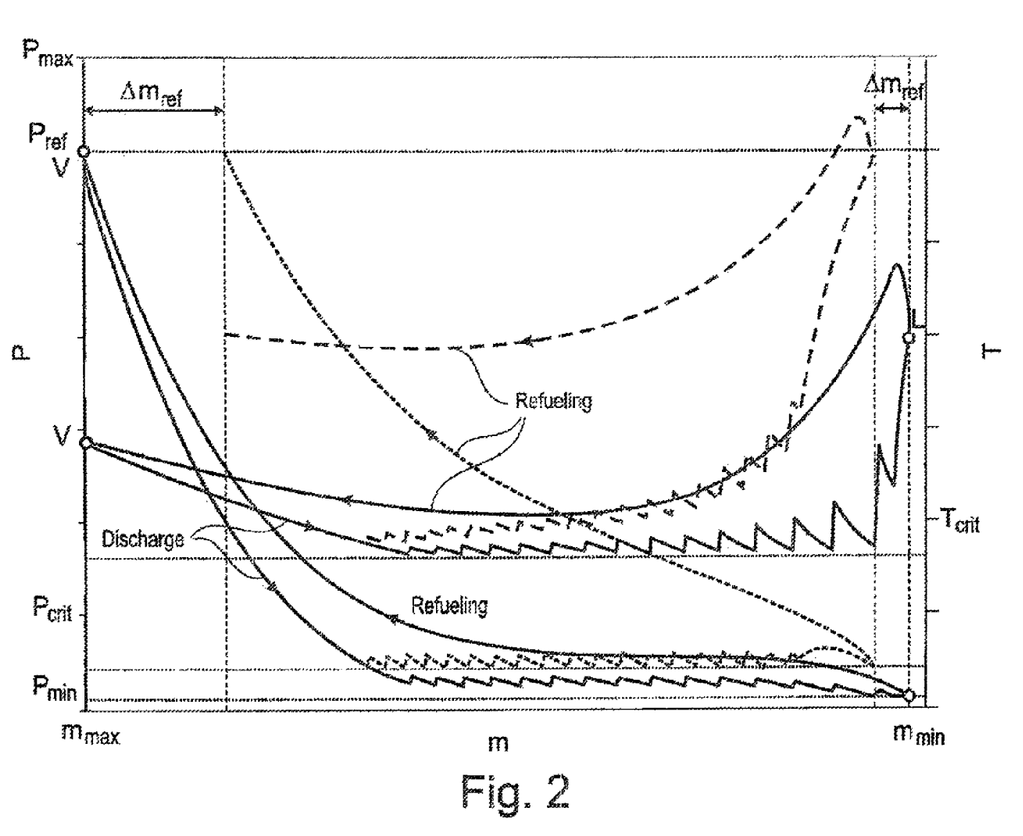
FIG. 2 is a diagram in which, in each case over a filling process and a subsequent removal process, the progression of the pressure and the temperature of the hydrogen stored in the tank, plotted on the ordinate, is exemplarily shown as a function of the mass of the hydrogen stored in the cryopressure tank of FIG. 1, plotted on the abscissa.

FIG. 2 shows a diagram in which, in each case over a filling process and a subsequent removal process, in the course of which processes the inner tank 1a (or cryopressure tank 1) previously emptied as far as possible is first completely filled and subsequently emptied as far as possible, the progression of the pressure p, plotted on the left ordinate, and of the temperature T, plotted on the right ordinate, in the inner tank 1a of the cryopressure tank 1 of FIG. 1 is illustrated as a function of the mass m of the hydrogen in the cryopressure tank 1, plotted on the abscissa. The progressions of pressure p and temperature T resulting from the method according to the invention are illustrated in solid lines while the progressions of the previous prior art according to the operating methods described in the afore-mentioned EP 2 217 845 B1 are illustrated in dashed lines in those regions in which they deviate from the respective progression according to the present invention. The curve progressions representing the pressure p are illustrated by single lines and the curve progression representing the temperature T are illustrated in double lines (two lines next to each other). The allocation of the individual curve sections to filling (=refueling) or emptying (=discharge) is apparent, on the one hand, from the added words and, on the other, from the direction of the triangular arrows inserted into the curve progressions.

The state in which the cryopressure tank 1 is emptied as far as possible is designated by the letter "L" for the curve progressions of pressure p and temperature T resulting from the method according to the invention, and the state in which the cryopressure tank 1 is filled as far as possible is designated by the letter "V". Starting from the state L, the cryopressure tank 1 is first completely filled with cryogenic hydrogen in the supercritical state by feeding it by means of an external pump, which is not illustrated, wherein the mass m, the pressure p and the temperature T increase according to the curve provided with a triangular arrow directed from "L" towards "V". Here, mass $m_{max}$ of hydrogen is introduced into the inner tank 1a only until a so-called refueling end pressure $p_{ref}$ is reached therein. This refueling end pressure lies below the maximum allowable pressure $p_{max}$ in the inner tank 1a by a certain value, which maximum allowable pressure occurs or will occur due to heat input from the surroundings through the tank wall, which cannot be avoided completely, when the vehicle is turned off for a longer period of, for example, one week after the tank 1 is filled completely.

During a removal of hydrogen at a later time, which preferably can take place without a feeding device solely because of the pressure gradient between the pressure in the inner tank 1a and the pressure in the mentioned consumer V, the mass m as well as the pressure p and the temperature T in the inner tank 1a of the cryopressure tank 1 decrease according to the curve provided with the triangular arrow directed from "V" towards "L". It is not required here to provide, in addition to the unavoidable low heat input through the tank wall, additional heat input introduced via a heat transfer medium and the internal second heat exchanger 9 (from FIG. 1) into the inner tank 1a as long as there is no risk of liquefaction of the residual hydrogen remaining in the tank. The latter is the case in first instance as long as the temperature T in the tank 1 or the inner tank 1a lies considerably above the pressure $p_{crit}$ in the critical point (=13 bar).

However, before the temperature in the tank 1 reaches this critical temperature $T_{crit}$ due to further removal of hydrogen, the temperature T of the hydrogen in the tank 1 is adjusted in first instance according to the invention by means of heat input into the inner tank 1a of the cryopressure tank 1 in such a manner that the temperature does not drop below this critical temperature $T_{crit}$. For this, as is shown by sections of the temperature curve and the pressure curve exhibiting a "sawtooth profile", the tank pressure control valve 7a (from FIG. 1) is closed or opened over a time period that significantly exceeds the cycle times of a conventional cycle valve, wherein corresponding feedback controlling of opening and closing takes place in such a manner that the temperature T ranges between 34 Kelvin and 36 Kelvin. Advantageously, the pressure p of the hydrogen in the tank 1 is adjusted in this manner to a value in the order of magnitude of 13 bar to 15 bar, and/or maintaining a pressure value in this range can be used as a further control variable in addition to the above-mentioned temperature criterion that still has priority in this state. A hydrogen pressure of this order of magnitude is by far high enough for reliable supply to a conventional consumer such as a fuel cell or an internal combustion engine that is not charged or charged at best to a minor extent, so that this consumer can be operated without limitation of the function thereof.

After the cryopressure tank 1 is emptied to the extent that further removal of hydrogen practically does not pose the risk of liquefaction of the residual hydrogen in the tank 1, which is indicated by the fact that at a pressure that is substantially constantly slightly above 13 bar, the temperature in the tank begins to increase to values significantly above 33 K, a switch is made to the pressure control explained before the description of the figures, which, in addition to maintaining a minimum pressure p in the order of magnitude of, e.g., 5 bar to 7 bar required for reliably supplying the consumer, can principally consider maintaining a minimal temperature above the critical temperature (of 33.14 Kelvin) as a further criterion, wherein, however, due to the minimum pressure $p_{min}$, the criterion of the critical temperature has not to be considered any more at all; rather, the latter is automatically achieved with the mentioned exemplary values. As is shown in FIG. 2, shortly before reaching the minimum fuel mass $m_{min}$ located in the tank, the temperature T can increase relatively sharply; however, even then, the temperature T is still below the values according to the dashed curve progression which are achievable according to the prior art, and thus is colder and hence more suitable for a subsequent refilling of the cryopressure tank 1.

As a result of the tank 1 that, in the "emptied" state, is colder compared to the prior art, it is possible with the operating method according to the invention to introduce a larger amount of cryogenic hydrogen under supercritical pressure during refilling of the cryopressure tank, as becomes apparent from the explicitly illustrated so-called reference mass $\Delta m_{ref}$, and which represents that mass difference between the operating method according to the invention and the operating method according to the prior art that is obtained at the same reference pressure $p_{ref}$ and based on different temperatures T with an empty tank. Advantageously, it is in addition possible with the operating method according to the invention to discharge the cryopressure tank to a greater extent, wherein also in this case complete discharging is naturally not possible. However, in the region of the points or the state "L", FIG. 2 shows a differential mass $\Delta m_{ref}$ which, in contrast to the prior art, can be additionally removed from the tank 1 since the minimum pressure value $p_{min}$ according to the inventive method is lower compared to the prior art, and the mass that cannot be removed from the tank therefore decreases.

Figure 3:
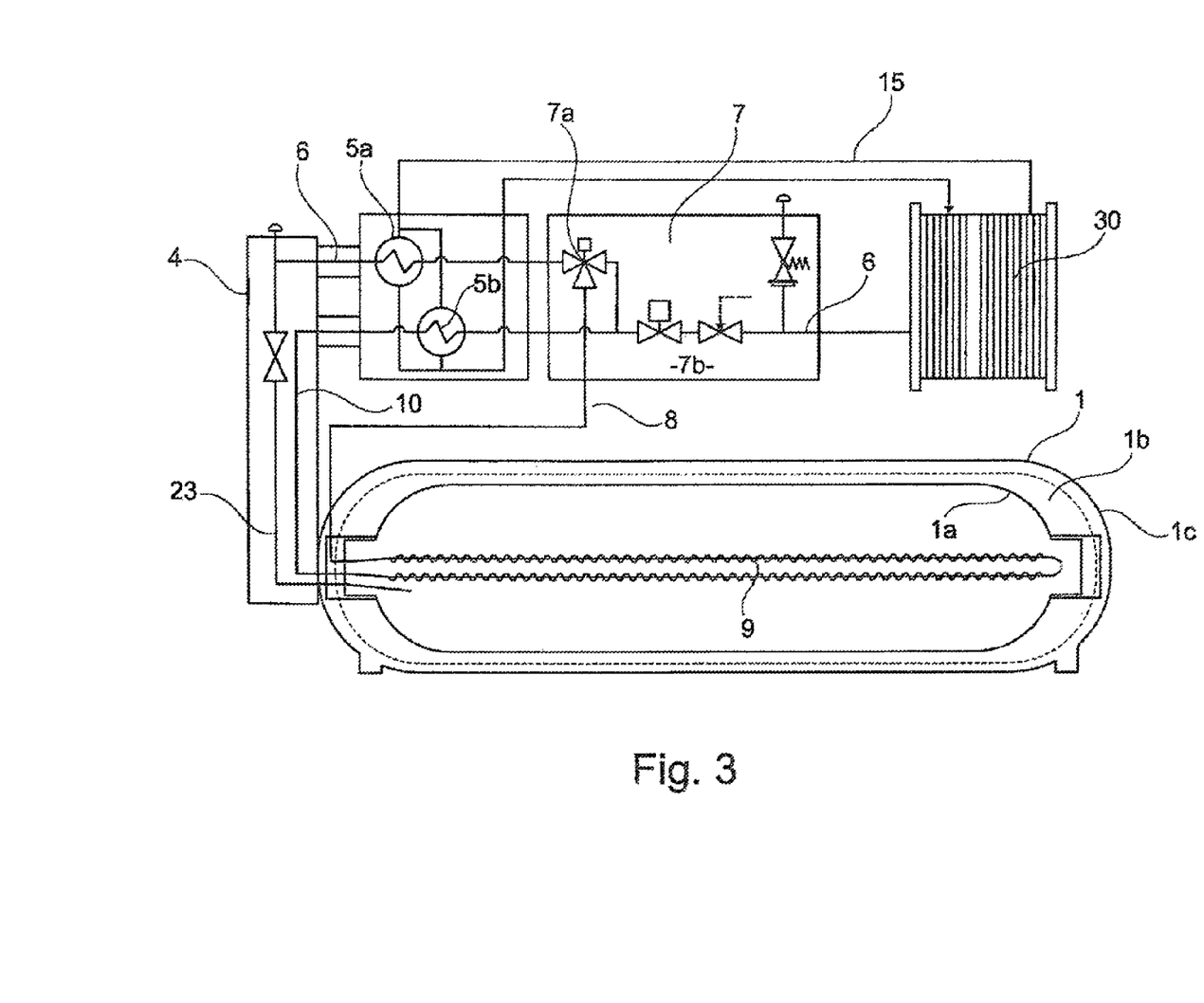
FIG. 3 is a schematic diagram showing, in addition to FIG. 1, a fuel cell system, wherein the waste heat of the fuel cell system can be partially fed to the cryopressure tank via a heat transfer medium.
Figure 4:
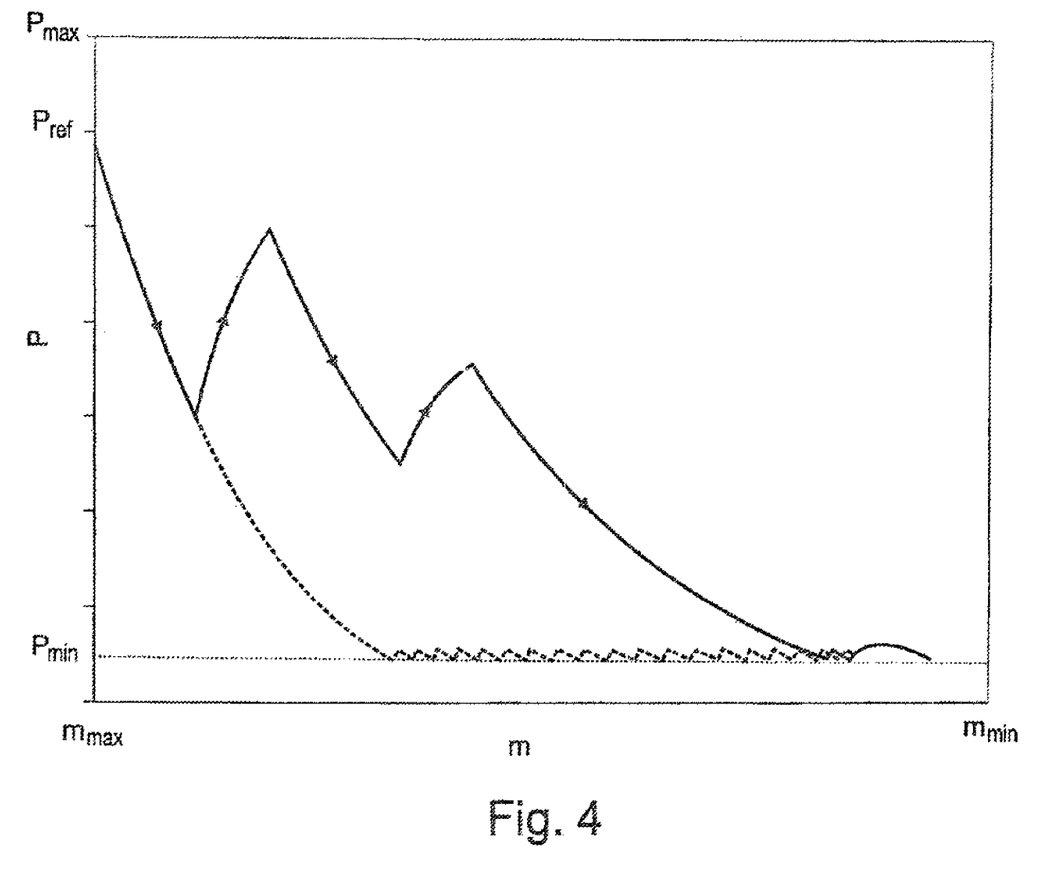
FIG. 4 is a graph showing, for the system according to FIG. 3, an exemplary progression of the pressure of the hydrogen in the cryopressure tank as a function of the mass thereof in the course of a complete removal of hydrogen from the tank.

A modification or supplement to the method according to the invention is explained based on the FIGS. 3 and 4. In addition to the elements already explained with regard to FIG. 1, FIG. 3 shows in an abstract manner a fuel cell system 30 that is integrated in the first heat exchanger circuit 15 so that waste heat resulting from the operation of the fuel cell system 30 can be dissipated at least in part to the heat exchangers 5a and 5b, and via the latter to the hydrogen fed through the second internal heat exchanger 9. In addition to the heat transfer circuit 15, another heat transfer circuit, which is not illustrated figuratively and which uses the surrounding air as a temperature sink, is provided for dissipating the operating heat of the fuel cell system 30, and which is mainly used for cooling the fuel cell system 30. Cooling the fuel system 30 via the heat transfer circuit 15 and thus by involving the cooling potential of the hydrogen stored in the inner tank 1a of the cryopressure tank 1 takes place, with the exception of those operating states of the cryopressure tank 1 in which, according to the preceding explanation, heat supply into the inner tank 1a has to take place in order to keep the temperature T of the hydrogen stored therein above the critical temperature of 33.14 Kelvin or to keep the pressure p of this hydrogen above the mentioned minimum pressure $p_{min}$, only if there is such a high cooling capacity demand in/at the fuel cell system 30 that said cooling capacity demand cannot be covered alone by the other heat transfer circuit and which uses the surrounding air as a temperature sink.

Thus, when the fuel cell system 30 temporarily needs extremely high cooling that cannot be provided by the heat transfer circuit using the surrounding air as a temperature sink, it is possible, independent of the temperature T in the inner tank 1a of the cryopressure tank 1, to use the cooling potential of the hydrogen located in this inner tank 1a for cooling the fuel cell system 30 as long as the pressure p in the inner tank 1a does not increase, as a result of this additional heat supply into the tank 1a, beyond an allowable maximum pressure which preferably corresponds to the so-called reference pressure $p_{ref}$ from FIG. 2. Accordingly, at such a high cooling capacity demand of the fuel cell system 30, the control valve 7a is activated by a suitable electronic control unit, which in fact can be more useful than running the fuel system 30 in a special operating mode with significantly reduced power output due to danger of overheating. An exemplary progression of the pressure p as a function of the mass m of the hydrogen in the inner tank 1a is illustrated in FIG. 4 by a solid line for a plurality of such intensive cooling processes required in the course of completely emptying the tank. Those sections of the curve that exhibit an increase of pressure p as the mass m decreases illustrate a combined removal and cooling operation according to the preceding explanations. Furthermore, FIG. 4 also shows with a dashed line the progression of the pressure p from FIG. 2 as a function of the mass m, and it is apparent from the comparison of these two curves that with the intense heat input for cooling the fuel cell system the otherwise, as it were, clocked heat supply (illustrated by the sawtooth profile of the dashed curve of FIG. 2) for maintaining the temperature of the hydrogen in the tank above the critical temperature or the said minimum pressure for supplying the fuel cell system is no longer needed.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An operating method for a cryopressure tank, in which cryogenic hydrogen for supplying a consumer is storable at a supercritical pressure of 13 bar or more, the method comprising the acts of:
   either supplying a heat transfer medium to a heat exchanger provided in the cryopressure tank via a control valve, or not supplying the heat transfer medium into said heat exchanger, in order to compensate for pressure loss resulting from hydrogen removal from the cryopressure tank;
   actuating the control valve with respect to a desired temperature or a desired pressure of the hydrogen in the cryopressure tank based on a fill level of the cryopressure tank; wherein:
   in a case of a higher filling level and as long as there is a risk of liquefaction of residual hydrogen in the cryopressure tank during the removal of the cryogenic hydrogen from the cryopressure tank, adjusting a temperature of the hydrogen located in the cryopressure tank such that it does not drop below a critical temperature of 33.18 Kelvin, and
   in a case of a low fill level, when there is no longer the risk of liquefaction during the removal of the cryogenic hydrogen from the cryopressure tank and as long as this is possible with a residual amount of hydrogen contained in the cryopressure tank, adjusting a pressure in the cryopressure tank such that it does not drop below a minimum pressure value which the hydrogen removed from the cryopressure tank must have to be usable in the consumer without limiting the function thereof.

2. The operating method according to claim 1, wherein when the cryopressure tank is completely filled and with the continuous removal of the hydrogen from the cryopressure tank and the pressure prevailing in the cryopressure tank approaching a critical pressure of 12.81 bar, a pressure value in the order of magnitude of 13 bar to 15 bar is set as another control criterion in addition to the adjusting of the temperature of the hydrogen in the cryopressure tank above the critical temperature.

3. The operating method according to claim 2, wherein if the removal of the hydrogen from the cryopressure tank and the supply of the heat into the cryopressure tank in view of maintaining a pressure in the order of magnitude of 13 bar to 15 bar and a temperature of the hydrogen above the critical temperature results in a temperature increase of the hydrogen in the cryopressure tank, the pressure in the cryopressure tank is adjusted to a lower value in the order of magnitude of 3 bar to 7 bar.

4. The operating method according to claim 1, wherein if the removal of the hydrogen from the cryopressure tank and the supply of the heat into the cryopressure tank in view of maintaining a pressure in the order of magnitude of 13 bar to 15 bar and a temperature of the hydrogen above the critical temperature results in a temperature increase of the hydrogen in the cryopressure tank, the pressure in the cryopressure tank is adjusted to a lower value in the order of magnitude of 3 bar to 7 bar.

5. The operating method according to claim 1, wherein fuel removed from the cryopressure tank and heated in the heat exchanger is used as the heat transfer medium and is supplied to the heat exchanger in the cryopressure tank via a branch line branching off of a supply line that leads to the consumer, and after flowing through said heat exchanger, the heat is fed into the supply line downstream of the branch line.

6. The operating method according to claim 5, wherein a pressure control unit is provided in the supply line downstream of the branch line configured to supply hydrogen at the desired pressure to the consumer despite changes in pressure in the supply line upstream of the pressure control unit caused by switching of the control valve.

7. The operating method according to claim 1, wherein a fuel cell system is the consumer, waste heat of the fuel cell system being supplied at least in part to the heat transfer medium if a higher cooling capacity demand of the fuel cell system cannot be completely covered by a cooling system using surrounding air as a temperature sink, wherein depending on a current cooling capacity demand, heat dissipation from the fuel cell system with heat supply into the cryopressure tank is carried out until the hydrogen located in the cryopressure tank has reached a predefined maximum pressure.

8. The operating method according to claim 5, wherein a fuel cell system is the consumer, waste heat of the fuel cell system being supplied at least in part to the heat transfer medium if a higher cooling capacity demand of the fuel cell system cannot be completely covered by a cooling system using surrounding air as a temperature sink, wherein depending on a current cooling capacity demand, heat dissipation from the fuel cell system with heat supply into the cryopressure tank is carried out until the hydrogen located in the cryopressure tank has reached a predefined maximum pressure.

* * * * *